United States Patent
Gallegos et al.

(10) Patent No.: US 10,104,505 B2
(45) Date of Patent: Oct. 16, 2018

(54) MOBILE TETHER AND ALERT SYSTEM FOR GROUPS

(71) Applicant: FUJITSU LIMITED, Kawasaki-shi, Kanagawa (JP)

(72) Inventors: Judy Gallegos, Fremont, CA (US); Matthew Depetro, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 126 days.

(21) Appl. No.: 14/735,289

(22) Filed: Jun. 10, 2015

(65) Prior Publication Data
US 2016/0366557 A1    Dec. 15, 2016

(51) Int. Cl.
| | |
|---|---|
| *H04W 4/02* | (2018.01) |
| *H04W 68/00* | (2009.01) |
| *H04W 64/00* | (2009.01) |
| *H04W 4/021* | (2018.01) |

(52) U.S. Cl.
CPC .......... *H04W 4/025* (2013.01); *H04W 4/021* (2013.01); *H04W 64/00* (2013.01); *H04W 68/00* (2013.01)

(58) Field of Classification Search
CPC ..... H04W 4/021; H04W 4/025; H04W 64/00; H04W 68/00; H04W 4/12; H04W 4/14; H04W 8/10; H04W 8/14; H04W 92/08; H04M 1/72527; G06F 1/163; H04B 1/034; H04B 1/0343; H04B 1/0346; H04B 1/385; H04B 1/3861; G01S 19/16; G01S 19/235; G01S 19/34; G01S 2205/006; G01S 2205/008; G01S 5/0009; G01S 5/0018; B60R 25/102; G08B 13/1418; G08B 21/023; G08B 21/0236; G08B 21/0261; G08B 21/0269; G08B 21/0272; G08B 21/0283; G08B 21/0286; G08B 21/0288; G08B 21/22; G08B 25/006; G08B 25/016; G08B 29/046; G08G 1/207
USPC ........................ 455/404.1, 404.2, 456.1–457
See application file for complete search history.

(56) References Cited

U.S. PATENT DOCUMENTS

| | | | |
|---|---|---|---|
| 5,497,149 A | 3/1996 | Fast | |
| 6,388,612 B1 | 5/2002 | Neher | |
| 2006/0270421 A1 | 11/2006 | Phillips et al. | |
| 2010/0285771 A1* | 11/2010 | Peabody | G08B 25/016 455/404.2 |
| 2013/0035114 A1* | 2/2013 | Holden | H04W 4/028 455/456.3 |

FOREIGN PATENT DOCUMENTS

GB    2 392 331 A    2/2004

OTHER PUBLICATIONS

European Search Report for corresponding application No. 16165346.4, dated Jul. 20, 2016.

(Continued)

*Primary Examiner* — Erica Navar
(74) *Attorney, Agent, or Firm* — Maschoff Brennan

(57) ABSTRACT

A method may include receiving location communications from multiple wearable devices that indicate locations of the multiple wearable devices. The method may also include determining the locations of the multiple wearable devices based on the location communications. The method may also include receiving a request communication from a wearable device of the multiple wearable devices that indicates that a user of the wearable device requests assistance.

19 Claims, 9 Drawing Sheets

(56) References Cited

OTHER PUBLICATIONS http://www.pocketfinder.com/, retrieved Jul. 1, 2015.
http://www.giggle-bug.com/, retrieved Jul. 1, 2015.
http://www.myfilip.com/, retrieved Jul. 1, 2015.
http://www.myfilip.com/about-filip/, retrieved Jul. 1, 2015.
EP Office Action dated Nov. 21, 2017 in application No. 16 165 346.4-1870.

* cited by examiner

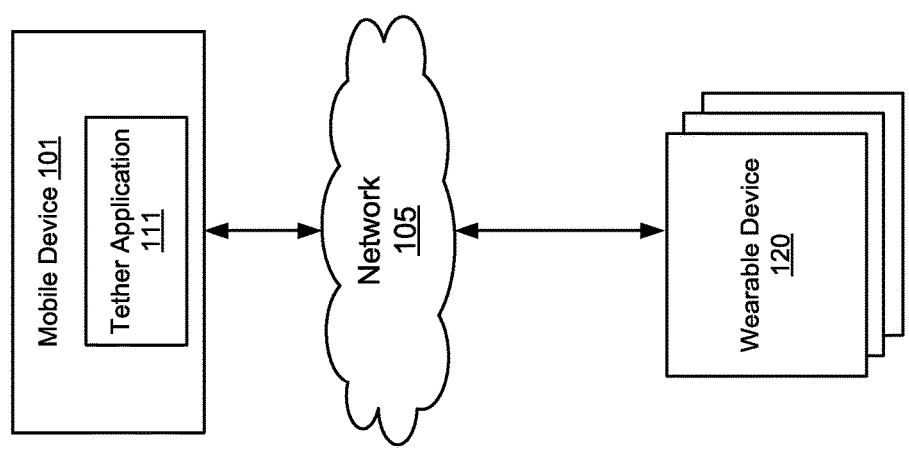

MOBILE TETHER AND ALERT SYSTEM FOR GROUPS

FIELD

The embodiments discussed herein are related to a mobile tether system for groups.

BACKGROUND

Various tracking devices exist for tracking locations of people and objects. For example, radio frequency identification (RFID) tags may be used in hospitals to keep track of patients. RFID tags may also be used in homes to keep track of personal items. In addition, global positioning systems (GPS) may be used by parents to keep track of their children.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving location communications from multiple wearable devices that indicate locations of the multiple wearable devices. The method may also include determining the locations of the multiple wearable devices based on the location communications. The method may also include receiving a request communication from a wearable device of the multiple wearable devices that indicates that a user of the wearable device requests assistance.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1 illustrates an example block diagram of a mobile tether system;

DESCRIPTION OF EMBODIMENTS

Figure 2A:
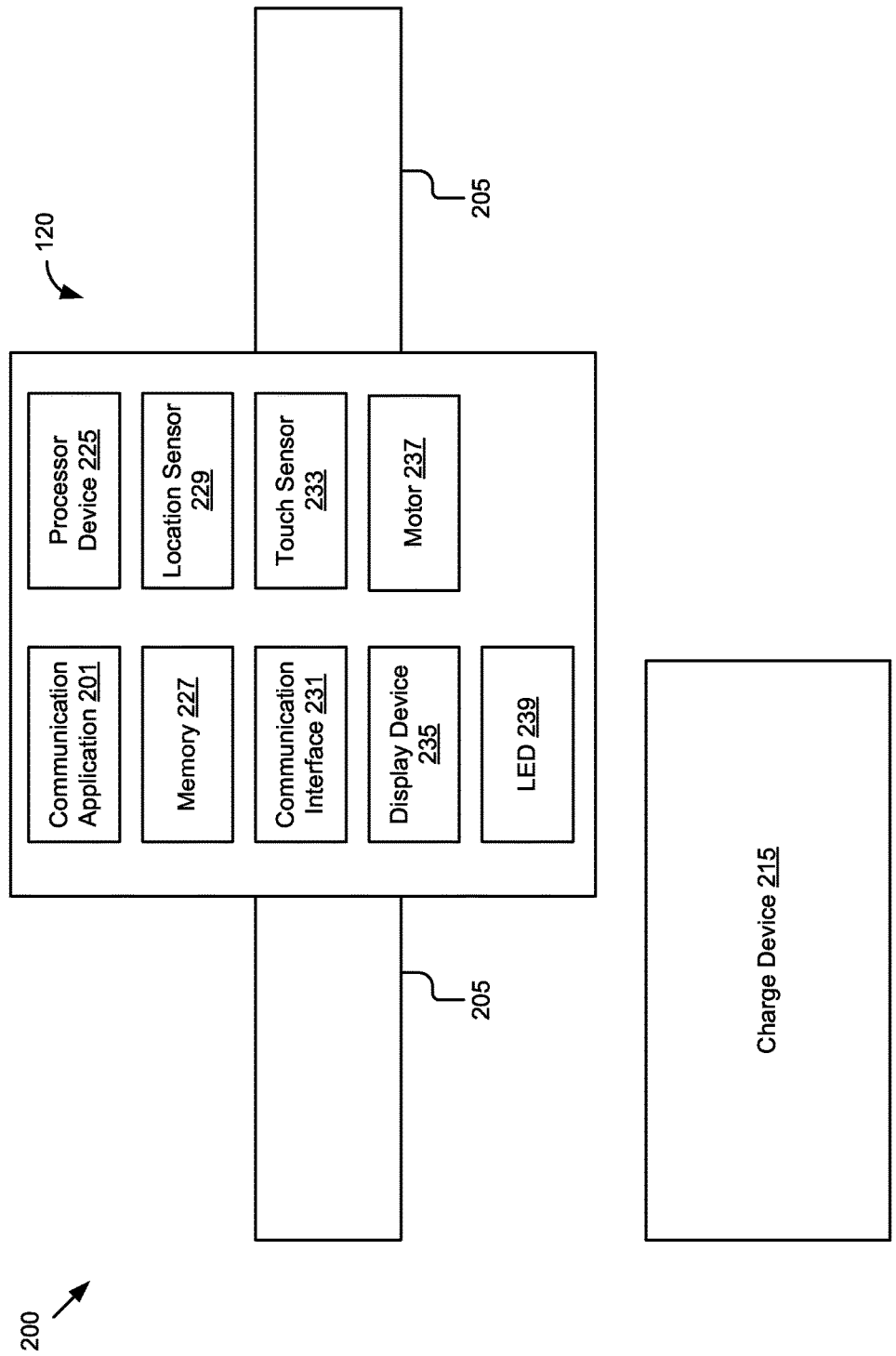
FIG. 2A illustrates an example block diagram of a communication system that may be included in the mobile tether system of FIG. 1.

There are a variety of situations when it may be desirable for a group leader to monitor the location of the members of a group. For example, a teacher may want to monitor the location of all students that are on a field trip. In another example, a tour guide may want to monitor the location of all tourists in a group, especially if the group is located in a dangerous area, such as a disaster site, or the group is dispersed over a large amount of territory.

Some locator systems identify a user based on a location of the user's mobile device. For example, a locator system may include a wearable device that transmits a location of the wearable device to a software application that may be accessed on a mobile device. The software application may generate a user interface that displays the location of the wearable device on a map. In some examples, the wearable device may include a display device that displays text messages from a user of the software application. These locator systems typically involve a 1-1 pairing between the software application and the wearable device such that they fail to support tracking of multiple wearable devices by a single software application and they also fail to support bidirectional communication among the software application and the multiple wearable devices. These locator systems also fail to support determining the location of the wearable devices using wireless triangulation.

In another example, a locator system may use radio frequency identification (RFID) tags to track locations of people. When the RFID tags exceed a threshold distance from a location or are outside of an electronic boundary, an alarm may be activated. The locator system may be useful, for example, in a hospital to prevent babies from being abducted. Although the locator system may support tracking multiple items with RFID tags, the locator system fails to support bidirectional communication between a locator device and the RFID tags. In addition, the locator system fails to support determining the location of the RFID tags using wireless triangulation or global positioning system (GPS) tracking.

In comparison to the foregoing systems, some embodiments described herein may include a mobile device with a tether application that is used by a user that wants to monitor a group. For example, the user of the mobile device may be a chaperone that wants to monitor a group of students on a field trip. The students may wear wearable devices that transmit location communications to the tether application. The tether application may determine locations of the wearable devices and generate a user interface that includes graphics that display the locations of the wearable devices.

The tether application may determine whether locations of the wearable devices are outside an approved area and may transmit a warning instruction to one or more of the wearable devices outside the approved area that causes the one or more wearable devices to generate haptic feedback. The haptic feedback may advantageously provide a silent notification. For example, the one or more wearable devices may vibrate three times to indicate that the one or more wearable devices are outside the approved area. More generally, the one or more wearable devices may generate haptic, aural, and/or visual output to indicate that the one or more wearable devices are outside the approved area and/or to convey other communications from the user of the mobile device to a corresponding user of each of the one or more wearable devices.

In some embodiments, the tether application determines the locations of each of the one or more wearable devices using wireless triangulation. For example, the tether application may use reference points and signal strengths to determine the locations of the one or more wearable devices.

The mobile device and the wearable devices may perform bidirectional communication. The mobile device may communicate with the wearable devices by providing communications such as a warning instruction to the wearable devices, a request instruction to cause the wearable devices to generate haptic feedback to request that the wearable device be physically moved to join the group, a communication that is displayed on a display device of one of the wearable devices, an emit instruction that causes a light-emitting diode (LED) on one of the wearable devices to emit an optical signal, or other communications. One of the wearable devices may communicate with the mobile device by providing a request communication that indicates that a user of the wearable device requests assistance. For example, the user of the wearable device may be a child that is lost and requests assistance from a teacher or chaperone to locate the child. The wearable device may also provide a communication to the mobile device that acknowledges that the user of the wearable device receives haptic feedback. For example, a tour guide may send a warning to a wearable device that is outside of an approved area. After the user of the wearable device acknowledges that the user receives the warning, the tour guide may not continue closely monitoring the user.

Embodiments of the present invention will be explained with reference to the accompanying drawings. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

FIG. 1 illustrates an example block diagram of a mobile tether system 100, arranged in accordance with at least one embodiment described herein. The mobile tether system 100 may include a network 105, a mobile device 101, and wearable devices 120.

In general, the network 105 may include one or more wide area networks (WANs) and/or local area networks (LANs) that may enable communication among the mobile device 101 and the wearable devices 120. In some embodiments, the network 105 includes the Internet, including a global internetwork formed by logical and physical connections between multiple WANs and/or LANs. Alternately or additionally, the network 105 may include one or more cellular radio frequency (RF) networks, GPS networks, and/or one or more wired and/or wireless networks such as, but not limited to, 802.xx networks, Bluetooth access points, wireless access points, or internet protocol (IP)-based networks. The network 105 may also include servers that enable one type of network to interface with another type of network.

The mobile device 101 may include a laptop computer, a tablet computer, a mobile phone, a smartphone, a smart watch or some other connected device, a personal digital assistant (PDA), an e-reader device, or other suitable mobile device. The mobile device 101 may include a tether application 111 that may be configured to, e.g., determine locations of the wearable devices 120, generate a user interface that includes graphics that display the locations of the wearable devices 120, and provide warning instructions or other communications to the wearable devices 120 that cause the wearable devices 120 to generate haptic feedback, aural feedback, visual feedback, or other output. In some embodiments, the tether application 111 may determine the locations of the wearable devices 120 using wireless triangulation.

Although only one mobile device 101 is illustrated, the mobile tether system 100 may include multiple mobile devices 101. For example, the mobile tether system 100 may be used by tour guides and a group of tourists. Multiple tour guides from a tour may use different mobile devices 101 to keep track of their designated group of tourists. In another example, the mobile tether system 100 may be used by a teacher, teacher's aides, and students. The teacher and the teacher's aides may use the mobile devices 101 to access the tether application 111; however, the teacher's aides may receive restricted permission to use all the functions of the tether application 111. For example, the teacher's aides may use the tether application 111 to communicate with an assigned group of students, while the teacher may be able to use the tether application 111 to communicate with all the wearable devices 120. Alternatively the teacher's aides may have unrestricted permission to use all the functions of the tether application 111.

In some embodiments, the tether application 111 may be implemented using hardware including a field-programmable gate array (FPGA) or an application-specific integrated circuit (ASIC). In some other embodiments, the tether application 111 may be implemented using a combination of hardware and software.

Each of the wearable devices 120 may include a processor, a memory, and a communication application as discussed in greater detail below with reference to FIGS. 2A and 2B. In some embodiments, the wearable devices 120 may include a flexible material, such as plastic, silicone, leather, or rubber and may be worn around a user's wrist. In other embodiments, the wearable devices 120 may be designed as jewelry. For example, the wearable devices 120 may include a ring, necklace, bracelet, or anklet. In some other embodiments, the wearable devices 120 may be designed to clip to a user's clothing. For example, the wearable devices 120 may be designed to clip to a belt buckle, pocket, or brassiere.

FIG. 2A illustrates an example block diagram of a communication system 200 that may be included in the mobile tether system of FIG. 1, arranged in accordance with at least one embodiment described herein. The communication system 200 may include the wearable device 120 and a charge device 215. An example wearable device 120 may include a wristband 205, a communication application 201, a processor device 225, a memory 227, a location sensor 229, a communication interface 231, a touch sensor 233, a display device 235, a motor 237, and an LED 239.

The communication application 201 may include code and routines configured to generate a communication. For example, the communication may include an acknowledgement that a user of the wearable device 120 received haptic feedback or other feedback or communication(s) from the mobile device 101 of FIG. 1. In another example, the communication may be a request for assistance from the user of the wearable device 120 to, e.g., a user of the mobile device 101. The communication application 201 may also be configured to generate a user interface. The user interface may include text, graphics, or a combination of text and graphics. For example, the user interface may include text or graphics depicting communications from the mobile device 101 that are rendered by the display device 235.

In some embodiments, the communication application 201 may be implemented using hardware including an FPGA or an ASIC. In some other embodiments, the communication application 201 may be implemented using a combination of hardware and software. The communication application 201 will be discussed in greater detail below with reference to FIG. 2B.

The processor device 225 may include an arithmetic logic unit, a microprocessor, a general-purpose controller, or some other processor or processor array to perform or control performance of operations as described herein. The processor device 225 processes data signals and may include various computing architectures including a complex instruction set computer (CISC) architecture, a reduced instruction set computer (RISC) architecture, or an architecture implementing a combination of instruction sets. Although FIG. 2A includes a single processor device 225, multiple processor devices 225 may be included. Other processors, operating systems, and physical configurations may be possible. In some embodiments, the wearable device 120 is a special-purpose processor-based computing device configured to perform one or more blocks of method 600 of FIG. 6 when executed by the processor device 225.

The memory 227 may store instructions or data that may be executed or operated on by the processor device 225. The instructions or data may include programming code that may be executed by the processor device 225 to perform or control performance of the operations described herein. The memory 227 may include a dynamic random access memory (DRAM) device, a static random access memory (SRAM) device, flash memory, or some other memory device. In some embodiments, the memory 227 also includes a non-volatile memory or similar permanent storage and media including a hard disk drive, a floppy disk drive, a compact disc-ROM (CD-ROM) device, a DVD-ROM device, a DVD-RAM device, a DVD-RW device, a flash memory device, or some other mass storage for storing information on a more permanent basis. In some embodiments, the memory 227 may include a tangible or non-transitory memory that stores code or routines configured to execute one or more blocks of the method 600 of FIG. 6 when executed by the processor device 225.

The location sensor 229 may receive location data that may be used to determine a location of the wearable device 120. For example, the location sensor 229 may receive location data including GPS data or Wi-Fi data indicating the location of the wearable device 120. In some embodiments, the location sensor 229 receives location data that may be used for wireless triangulation. For example, the location sensor 229 may receive location data about reference points and signal strengths. The reference points may include a wireless access point, a Wi-Fi hotspot, another wearable device 120, or the mobile device 101. The location sensor 229 may transmit the location data to the mobile device 101 via the communication interface 231 for the mobile device 101 to perform wireless triangulation. In some other embodiments, the location sensor 229 may perform wireless triangulation.

The communication interface 231 may transmit data to and receive data from the mobile device 101 of FIG. 1. The communication interface 231 may transmit data to and receive data from any other entities, such as to and from other wearable devices 120. In some embodiments, the communication interface 231 may include a wireless transceiver for exchanging data with at least one of the mobile devices 101, other wearable devices 120, or other communication channels using one or more wireless communication methods, including IEEE 802.11, IEEE 802.16, Bluetooth®, or another suitable wireless communication method.

In some embodiments, the communication interface 231 may include a cellular communications transceiver that may send and receive data over a cellular communications network including via short messaging service (SMS), multimedia messaging service (MMS), hypertext transfer protocol (HTTP), direct data connection, wireless application protocol (WAP), e-mail, or another suitable type of electronic communication. In some embodiments, the communication interface 231 may include a wireless transceiver. The communication interface 231 may also provide other connections to the network 105 of FIG. 1 for distribution of files or media objects using standard network protocols including transmission control protocol/internet protocol (TCP/IP), HTTP, HTTP secure (HTTPS), and simple mail transfer protocol (SMTP), etc.

The touch sensor 233 may detect touches to the wearable device 120 and make determinations based on the touches. For example, the touch sensor 233 may be configured to detect a number of taps from a user. The touch sensor 233 may determine that the number of taps corresponds to an acknowledgement that the user of the wearable device 120 received haptic feedback generated by the motor 237 or that the user of the wearable device received another communication from the mobile device 101 of FIG. 1. In another example, the touch sensor 233 may determine that the number of taps corresponds to a request for assistance from the user. Alternately or additionally, the touch sensor 233 may determine locations on the wearable device 120 of taps from the user of the wearable device 120. The number, location, and/or other aspects of the taps, or other inputs by the user of the mobile device 120 may be effective to generate an acknowledgement, request, or other communications from the user of the wearable device 120 to the user of the mobile device 101. The touch sensor 233 may transmit tap data and/or other input data describing the acknowledgement, the request, or other communication to the communication application 201.

In some embodiments, the touch sensor 233 may include any of a pressure transducer that measures a change in pressure when the user presses the wearable device 120, a proximity sensor that detects the user interacting with the display device 235, a force transducer that measures a change in a total impact on the wearable device 120, a gyroscope that detects changes in orientation, and an accelerometer that detects changes in acceleration. Instead of or in addition to the touch sensor 233, the wearable device 120 may include any input device configured to receive input from the user, such as a microphone, a physical button or nob, or other suitable input device.

In some embodiments, the touch sensor 233 may include a touchscreen. In some embodiments, the touchscreen uses a capacitive touch sensor that detects the user making physical contact with the touchscreen. For example, when the user taps the touchscreen to represent the acknowledgement that the user received haptic feedback or other feedback or communication, the touch sensor 233 detects the contact and the display device 235 may display additional information. For example, the display device 235 may receive graphics from the communication application 201 that, when rendered, display a user interface for the user to select a subset of the mobile devices 101 to receive the acknowledgement.

The display device 235 may display information. In some embodiments, the wearable device 120 receives communications from the mobile device 101 and displays the communications on the display device 235. Alternately or additionally, the display device 235 receives graphical data from the communication application 201 that the display device 235 renders as a user interface. In some embodiments, the display device 235 receives user input from the touch sensor 233.

The motor 237 may receive a feedback instruction from the mobile device 101 to provide haptic feedback. In some embodiments, the motor 237 may include a piezoelectric motor. The motor 237 may vibrate in predetermined patterns of vibration to provide the haptic feedback. For example, the motor 237 may vibrate for two seconds, stop for two seconds, and vibrate for two seconds to convey a pattern of two buzzes. The predetermined pattern of vibration may correspond to a warning, a request, or another communication, and different patterns of vibration may correspond to different warnings, requests, or communications. For example, one buzz may indicate a warning from the mobile device 101 that the wearable device 120 is outside of the approved area and two buzzes may indicate a request that the wearable device 120 be physically moved to join or rejoin a group. In some embodiments, the motor 237 may receive a first instruction from the mobile device 101 to provide continual haptic feedback until the motor 237 receives a second instruction from the mobile device 101 to stop providing haptic feedback. For example, the mobile device 101 may start vibrating when the wearable device 120 is outside the approved area and may continue to vibrate until the wearable device 120 is back inside the approved area.

The LED 239 may emit an optical signal to provide a warning or request an action or otherwise provide a communication to the user of the wearable device 120. The LED 239 may receive an instruction from the mobile device 101, via the communication interface 231, to emit the optical signal. The warning may occur, for example, when the wearable device 120 physically moves outside the approved area. In another example, the request for the action may include a request that the wearable device 120 be physically moved to join the group. The LED 239 may emit the optical signal instead of the motor 237 vibrating, or the LED 239 may emit the optical signal in addition to the motor 237 vibrating.

In some embodiments, the LED 239 may include multiple LEDs 239 and the multiple LEDs may emit different colors to provide different instructions. For example, a first LED 239 may emit an optical signal that corresponds to green in the visible spectrum for the request to physically move the wearable device 120 to join the group. A second LED 239 may emit an optical signal that corresponds to red in the visible spectrum as a warning when the wearable device 120 moves outside of the approved area.

The display device 235, the motor 237, and the LED 239 are examples of output devices that may be included in the wearable device 120 to convey communications from the user of the mobile device 101 or other information to the user of the wearable device 120. Alternatively or additionally, the wearable device 120 may include one or more other output devices to convey communications from the user of the mobile device 101 or other information to the user of the wearable device 120. For example, the wearable device 120 may include a speaker or other output device.

The charge device 215 may charge the wearable device 120 of FIG. 2A and/or one or more of the wearable devices 120 of FIG. 1 separately or at the same time. For example, the wearable device 120 may include rechargeable batteries that the charge device 215 recharges. The charge device 215 may include a charging pad that may be configured to charge one or more of the wearable devices 120. For example, the charge device 215 implemented as the charging pad may use inductive coupling to charge the wearable device 120 when it is within proximity of the charging pad. In another example, the charging pad may use conductive coupling to charge the wearable device 120 when it is in physical contact with the charging pad.

In another embodiment, the charge device 215 charges the wearable devices 120 that are physically wired to the charge device 215. For example, the wearable devices 120 may each include a mini USB connector, a USB connector, a dock connector, or another type of connector to connect the wearable devices 120 to the charge device 215.

In some embodiments, the wearable devices 120 and the charge device 215 may be sold as a set. For example, the charge device 215 may be configured to charge a set of wearable devices 120. In another embodiment, a single one of the wearable devices 120 and the charge device 215 may be sold as a pair.

Figure 2B:
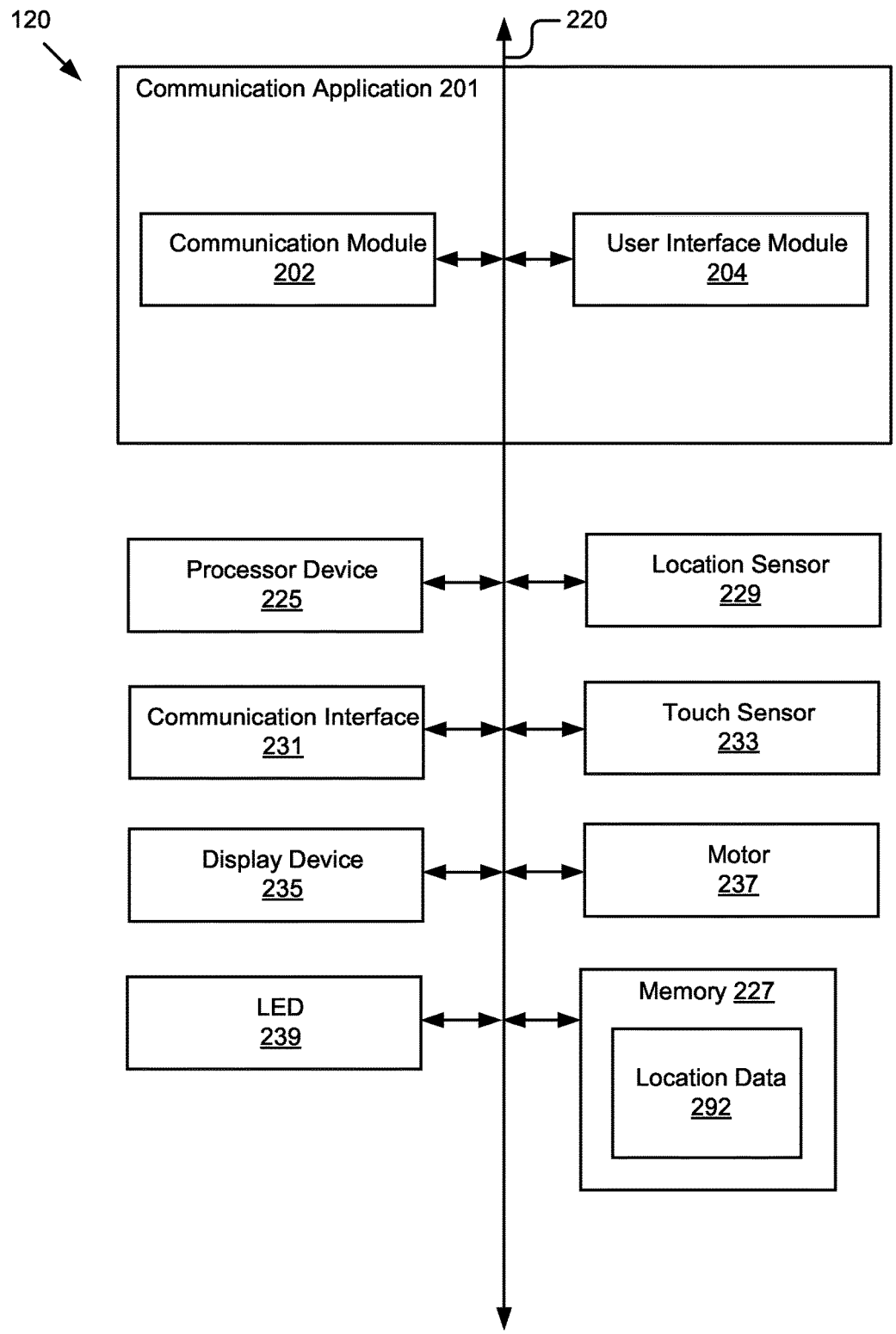
FIG. 2B illustrates an example block diagram of a wearable device that may be included in the mobile tether system of FIG. 1.

FIG. 2B illustrates an example block diagram of the wearable device 120 that may be included in the mobile tether system 100 of FIG. 1 and in the communication system 200 of FIG. 2A, arranged in accordance with at least one embodiment described herein. In some embodiments, the wearable device 120 includes the communication application 201, the processor device 225, the memory 227, the location sensor 229, the communication interface 231, the touch sensor 233, the motor 237, the display device 235, and the LED 239. The components of the wearable device 120 may be communicatively coupled by a bus 220. The bus 220 may include a memory bus, a storage interface bus, a bus/interface controller, an interface bus, or the like, or any combination thereof. The communication application 201 may include a communication module 202 and a user interface module 204.

Descriptions of the processor device 225, the memory 227, the location sensor 229, the communication interface 231, the touch sensor 233, the motor 237, the display device 235, and the LED 239 may be found above with reference to FIG. 2A.

In addition to the description of the memory 227 described above with reference to FIG. 2A, the memory 227 may store location data 292. The location data 292 may include information detected by the location sensor 229, such as location coordinates received from GPS satellites and/or wireless data. The wireless data may be used for wireless triangulation. For example, the wireless data may include locations of reference points, such as a wireless access point, a Wi-Fi hotspot, another wearable device 120, or the mobile device 101; signal strengths or relative directions of signals received from the reference points; and/or identifiers that uniquely identify the reference points. The location data 292 may alternately or additionally include the location of the wearable device 120 as determined by the location sensor 229.

As illustrated in FIG. 2B, the communication application 201 may include the communication module 202 and/or the user interface module 204. The communication application 201, including the modules 202 and 204, may generally include software that includes programming code and/or computer-readable instructions executable by the processor device 225 to perform or control performance of the functions and operations described herein. The communication application 201 may receive data from another one of the components of the wearable device 120 and may store the data in the memory 227. Alternately or additionally, the communication application 201 may send data to other components of the wearable device 120 and/or may write data to the memory 227.

The communication module 202 may generally be configured to generate a communication that is transmitted to the mobile device 101 of FIG. 1, as described in more detail herein. The user interface module 204 may be generally configured to generate a user interface, as described in more detail herein.

The communication module 202 may be configured to generate a communication. For example, the communication module 202 may receive data indicating that a user activated the touch sensor 233 to signal that the user requests assistance. For example, the wearable devices 120 may be worn by foreign exchange students or students in study abroad programs where a student may activate the touch sensor 233 to signal that the student requests assistance. In response to receiving the data, the communication module 202 may generate a request communication that indicates that the user requests assistance. This advantageously provides a way for the student, who may not know the local language, to signal that the student requests assistance without having to write in a foreign language during an emergency.

In another example, the communication module 202 may receive data indicating that a user activated the touch sensor 233 to signal that the user received haptic feedback. The communication module 202 may generate an acknowledgement communication that indicates that the user received the haptic feedback. In some embodiments, the communication module 202 may generate each of the communications in response to the user tapping the touch sensor 233 a predetermined number of times, where the predetermined number of times may be different for each type of communication.

More generally, the communication module 202 may generate communications to send to the mobile device 101 based on any suitable input received from the user of the wearable device 120.

The user interface module 204 may be configured to generate a user interface. For example, the user interface module 204 may generate graphical data that, when rendered by the display device 235, displays a user interface that includes communications from the mobile device 101. In some embodiments, the user interface module 204 receives user input for transmitting communications. For example, the user interface module 204 may receive user input from a user via a touchscreen that the communication module 202 uses to generate a communication that is transmitted to the mobile device 101. In another embodiment, the user interface module 204 receives user input from the user via the touchscreen that is used to configure the settings of the wearable device 120.

Figure 3:
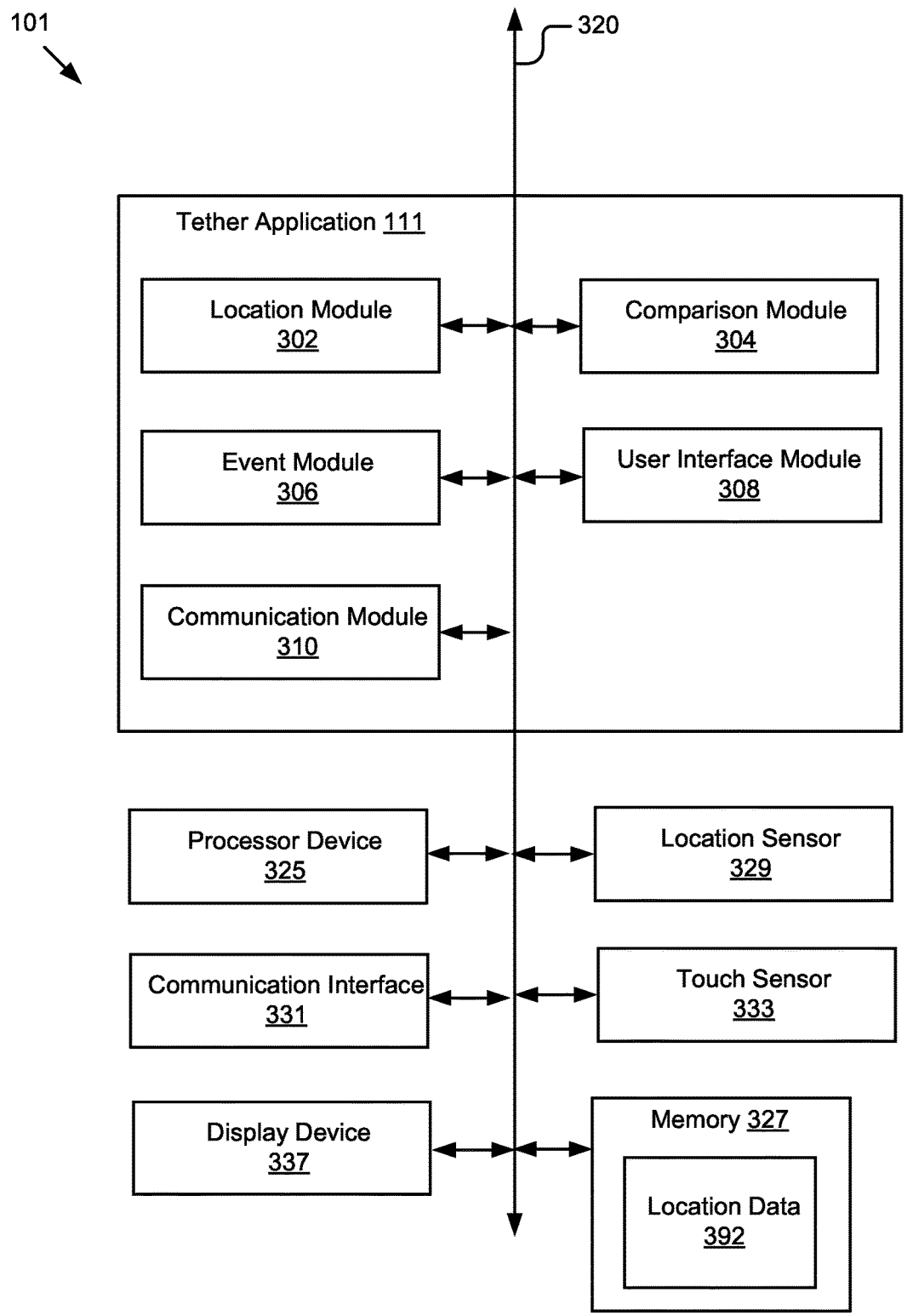
FIG. 3 illustrates an example block diagram of a mobile device that may be included in the mobile tether system of FIG. 1.

FIG. 3 illustrates an example block diagram of the mobile device 101 that may be included in the mobile tether system 100 of FIG. 1, arranged in accordance with at least one embodiment described herein. The mobile device 101 may include the tether application 111, a processor device 325, a memory 327, a location sensor 329, a communication interface 331, a touch sensor 333, and a display device 337 that are each coupled to a bus 320. The bus 320 may include a memory bus, a storage interface bus, a bus/interface controller, an interface bus, or the like or any combination thereof. Descriptions of the processor device 325, the memory 327, the location sensor 329, the communication interface 331, the touch sensor 333, and the display device 337 may be similar, mutatis mutandis, to the processor device 225, the memory 227, the location sensor 229, the communication interface 231, the touch sensor 233, and the display device 235 described above with reference to FIG. 2A.

Figure 5A:
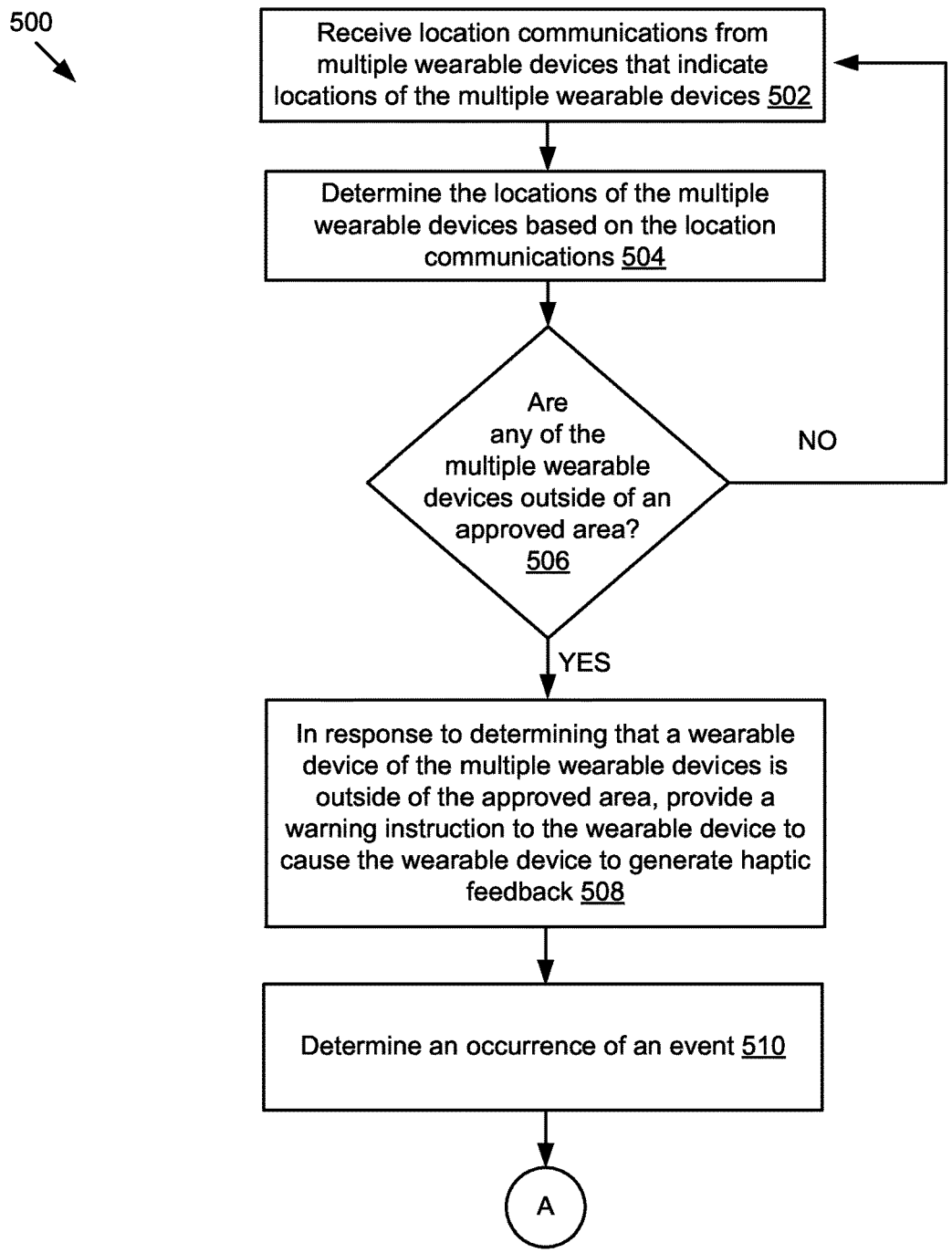
FIGS. 5A-5B illustrate an example flow diagram of a method of bidirectional communication to determine the locations of multiple wearable devices.
Figure 5B:
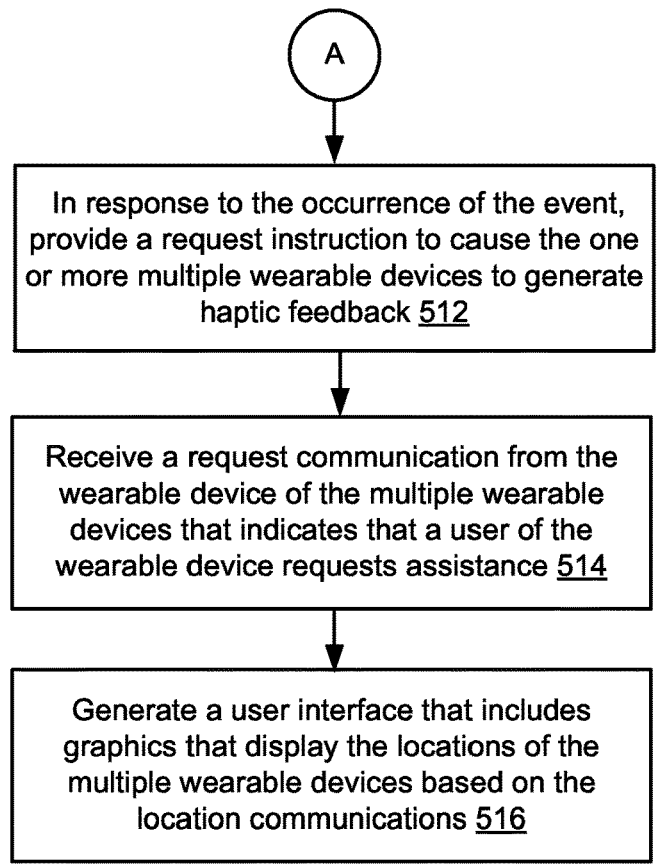
Figure 7:
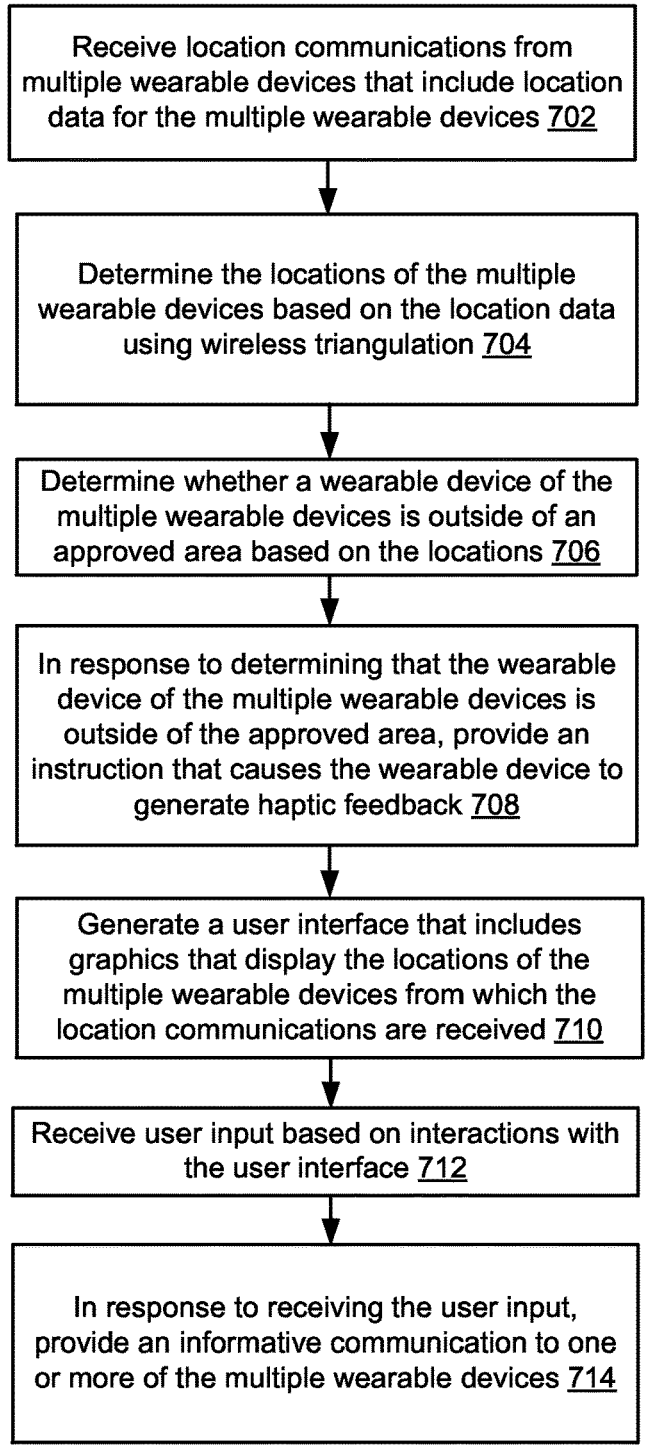
FIG. 7 illustrates an example flow diagram of a method to determine locations of multiple wearable devices using wireless triangulation.

In some embodiments, the mobile device 101 is a special-purpose processor-based computing device configured to perform one or more blocks of method 500 of FIGS. 5A-5B and/or of method 700 of FIG. 7 when executed by the processor device 325. In some embodiments, the memory 327 may include a tangible or non-transitory memory that stores code or routines configured to execute one or more blocks of the methods 500 or 700 when executed by the processor device 325. The memory 327 may include location data 392 that includes the location data 292 described with reference to FIG. 2A for each of the wearable devices 120. The location data 392 may also include locations of the wearable devices 120 as determined by a location module 302 as discussed in greater detail below.

The tether application 111 may include any of the location module 302, a comparison module 304, an event module 306, a user interface module 308, and a communication module 310. The tether application 111, including the modules 302, 304, 306, 308, and 310, may generally include software that includes programming code and/or computer-readable instructions executable by the processor device 325 to perform or control performance of the functions and operations described herein. The tether application 111 may receive data from another one of the components of the mobile device 101 and may store the data in the memory 327. Alternately or additionally, the tether application 111 may send data to other components of the mobile device 101 and/or may write data to the memory 327.

The location module 302 may generally be configured to determine locations of the wearable devices 120 of FIG. 1, as described in more detail herein. The comparison module 304 may generally be configured to determine whether any of the locations of the wearable devices 120 of FIG. 1 are outside of the approved area and generate a warning instruction for the wearable devices 120 that are outside of the approved area to generate haptic feedback or other output to indicate to users of the wearable devices 120 that they are outside the approved area, as described in more detail herein. The event module 306 may generally be configured to determine an occurrence of an event and, in response to the occurrence of the event, generate a request instruction to cause the wearable devices 120 of FIG. 1 to generate haptic feedback or other output to convey the request to users of the wearable devices 120, as described in more detail herein. The user interface module 308 may generally be configured to generate a user interface, as described in more detail herein.

The location module 302 may be configured to receive the location data 292 from the wearable devices 120 and determine locations of the wearable devices 120 from the location data 292. The location module 302 may use wireless triangulation to determine the locations. For example, the location module 302 may determine a location of the wearable device 120 by using signal triangulation based on signal strength associated with reference points that include a wireless access point, a Wi-Fi hotspot, another wearable device 120, or the mobile device 101. In another example, one of the wearable devices 120 transmits, via Bluetooth or Wi-Fi, the location data 292 that includes GPS coordinates and signal strength for the GPS signals for other wearable devices 120 to the location module 302. The location module 302 may then use signal triangulation to determine the location of the wearable device 120 based on the signal strengths and reference points. In some embodiments, the location module 302 receives the location data 292 that includes the location of the wearable device 120 as determined by the wearable device 120. For example, the location data 292 may include GPS coordinates for the wearable device 120. The location module 302 may store the location data 292 for the wearable devices 120 as location data 392.

The comparison module 304 may be configured to determine whether any of the locations of the wearable devices 120 are outside of an approved area. The approved area may be based on a threshold distance between the mobile device 101 (or any of the mobile devices 101 if multiple mobile devices are present) and any of the wearable devices 120. For example, if the wearable devices 120 are used by students visiting a zoo, the threshold distance between chaperones carrying the mobile devices 101 and the children wearing the wearable devices 120 may be 10 feet, 20 feet, or other suitable distance. In some embodiments, the threshold distance may be set or adjusted by the user of the mobile device 101.

In some other embodiments, the approved area may include a geofence that includes a predefined set of boundaries. For example, if the wearable devices 120 are worn by elderly patients with dementia in a hospital, the geofence may include a perimeter of the hospital. After an elderly patient moves outside of the hospital, the comparison module 304 may determine that the wearable device 120 worn by the elderly patient is in an unapproved area.

In yet another embodiment, the approved area may be anything except a small subset of unapproved areas. For example, a group may tour a disaster site and certain areas may be prohibited because they are dangerous. In another example, the group may tour a factory where the unapproved areas include areas where sensitive documents are kept or areas with machinery that may expose the company to liability if a user is harmed.

If the comparison module 304 determines that one of the wearable devices 120 is outside of the approved area, the comparison module 304 may generate a warning instruction or other communication to cause the wearable device 120 to generate haptic feedback or other output. The communication interface 331 may provide the warning instruction to the wearable device 120 that is outside the approved area. The warning instruction to generate haptic feedback may include a predetermined pattern of vibrations to indicate that the wearable device 120 is outside the approved area.

The comparison module 304 may compare the locations of the wearable devices 120 periodically. For example, the comparison module 304 may compare the locations every second, every five seconds, every minute, according to some other period, or according to a non-periodic schedule. In some embodiments, the comparison module 304 generates the warning instruction to cause the wearable device 120 that is outside of the approved area to generate continual haptic feedback until the comparison module 304 determines that the wearable device 120 is back inside the approved area.

The event module 306 may determine that an event occurred. The event may include the end of a group activity. For example, the group activity may include a tour of a museum by a group of students. The event module 306 may determine the end of the group activity in response to a user of the mobile device 101 providing user input to a user interface or as indicated by a calendar item that includes a beginning and an ending time of an event. Data indicating the end of the group activity may be transmitted by the communication module 310 through the communication interface 331 to wearable devices 120 of the students to be output to the students as haptic feedback or other output. The haptic feedback or other output may include a predetermined pattern of vibrations or other output effective to request that the wearable device 120 be physically moved to join the group of students. For example, the group of students may meet at an agreed upon entrance of the museum at the end of the tour of the museum in response to receiving the haptic feedback or other output through the wearable devices 120.

The user interface module 308 may be configured to generate a user interface. For example, the user interface may include graphics for displaying the location of each of the wearable devices 120 that transmit location communications including the location data 292 to the mobile device 101. The user interface module 308 may also be configured to accept user input that the communication module 310 uses to generate a communication that the communication interface 331 provides to the wearable devices 120.

The communication module 310 may be configured to generate a communication. For example, the communication module 310 receives user input from the user interface module 308 and generates a communication based on the user input for users of the wearable devices 120. The communication may include, for example, a description of where the group will meet at the end of an event. In another embodiment, the communication module 310 may generate a warning communication warning that the wearable device 120 is outside of an approved area. The warning communication may be sent instead of, or in addition to, the warning instruction to cause the wearable device 120 to generate haptic feedback.

Figure 4:
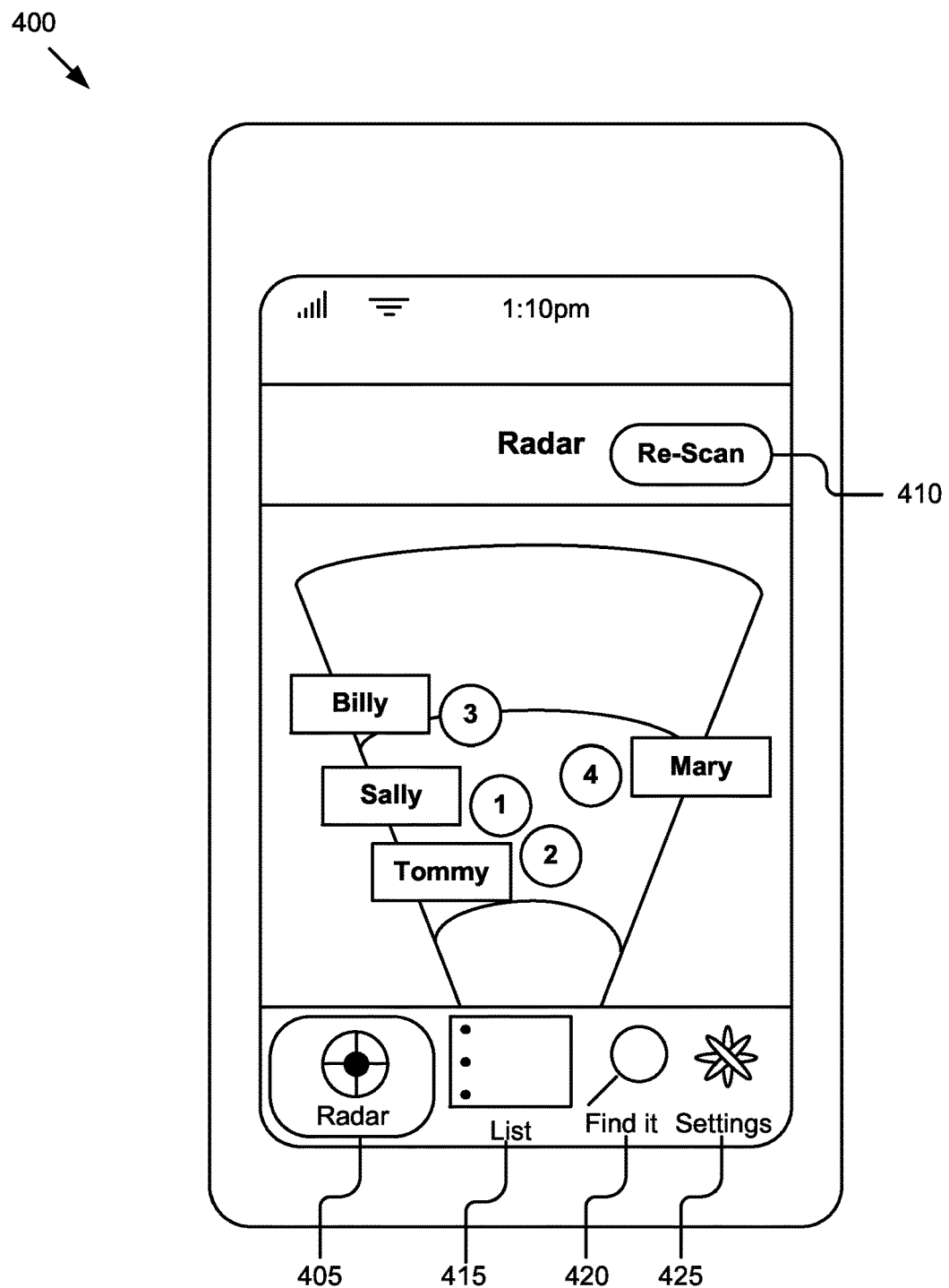
FIG. 4 illustrates an example user interface that may be displayed on the mobile device of FIG. 3.

FIG. 4 illustrates an example user interface 400 that may be displayed on the mobile device 101 of FIG. 3, arranged in accordance with at least one embodiment described herein. In this example, the user interface 400 includes radar information that is displayed by the display device 337 in response to a user selecting a "Radar" icon 405. The radar information includes locations for four wearable devices 120 that are each associated with a user name (Sally, Tommy, Billy, and Mary). The radar information includes a "Re-Scan" button 410 that, when selected by the user of the mobile device 101, may cause the user interface module 308 to instruct the location module 302 to determine the locations of the wearable devices 120. In some embodiments, selecting the "Re-Scan" button 410 may also cause the comparison module 304 to determine whether any of the locations of the wearable devices 120 are outside of the approved area.

The user interface 400 also includes a "List" icon 415 that, when selected, may cause the user interface module 308 to display a list of all the wearable devices 120 associated with the tether application 111.

The user interface 400 includes a "Find It" icon 420 that, when selected, may cause the user interface module 308 to display the location of one of the wearable devices 120. In some embodiments, the user interface may include options for interacting with a selected wearable device 120.

The user interface 400 may include an option that instructs the wearable device 120 to provide haptic feedback. For example, the group activity may include a scuba diving event and an instructor may want to provide haptic feedback to one of the wearable devices 120 when the instructor sees the user of the wearable device 120 straying too far from the group.

The user interface 400 may also include an option for receiving user input that the communication module 310 uses to generate a communication to send to one of the wearable devices 120. Continuing with the example in FIG. 4, the user may be able to select a number icon for one of the wearable devices 120 (1, 2, 3, or 4) to access options for providing haptic feedback or generating the communication for the selected wearable device 120. The communication may include, for example, information about a location where the group will meet after an end of an event.

Lastly, the user interface 400 includes a "Settings" icon 425 that, when selected, may cause the user interface module 308 to display settings information for the tether application 111. The settings may include an option to define different levels of control of the tether application 111. For example, one tether application 111 implemented as a master may provide all levels of control, and other tether applications 111 implemented as slaves may provide a subset of controls. The master may provide administrative authority to provide access to other users while the subset of controls may include an ability to instruct the wearable devices 120 to provide haptic feedback.

FIGS. 5A-5B illustrate an example flow diagram of a method 500 of bidirectional communication to determine locations of multiple wearable devices, arranged in accordance with at least one embodiment described herein. The method 500 may be implemented, in whole or in part, by one or more of the mobile devices 101 of FIG. 1, the tether application 111 of FIG. 3, or another suitable device, server, and/or system. The method 500 may begin at block 502.

In block 502, location communications may be received from the multiple wearable devices that indicate the locations of the multiple wearable devices. For example, the mobile device 101 of FIG. 1 and/or the location module 302 of FIG. 3 may receive the location communications from the multiple wearable devices 120 of FIG. 1, FIG. 2A, or FIG. 2B. Alternatively or additionally, the location communications may include the location data 292 of FIG. 2B.

In block 504, the locations of the multiple wearable devices may be determined based on the location communications. For example, the mobile device 101 of FIG. 1 and/or the location module 302 of FIG. 3 may determine the locations for the multiple wearable devices 120 of FIG. 1, FIG. 2A, or FIG. 2B.

In block 506, it is determined, based on the locations of the multiple wearable devices, whether any of the multiple wearable devices are outside of an approved area. For example, the mobile device 101 of FIG. 1 and/or the comparison module 304 of FIG. 3 may determine whether any of the multiple wearable devices 120 of FIG. 1, FIG. 2A, or FIG. 2B are outside of the approved area. The approved area may include a predetermined threshold distance from the mobile device 101 of FIG. 1 or a geofence. Block 506 may be followed by block 502 ("NO") or block 508 ("YES"). If the locations are all within the approved area ("NO" at block 506), block 506 may be followed by block 502. If any of the locations of the multiple wearable devices are outside the approved area ("YES" at block 506), block 506 may be followed by block 508.

In block 508, in response to determining that a wearable device of the multiple wearable devices is outside of the approved area, a warning instruction may be provided to the wearable device to cause the wearable device to generate haptic feedback or other output. For example, the mobile device 101 of FIG. 1 and/or the communication interface 331 of FIG. 3 may provide the warning instruction to the wearable device 120 of FIG. 1, FIG. 2A, or FIG. 2B. The haptic feedback or other output may include a predetermined pattern of vibrations or other output to indicate that the wearable device is outside of the approved area. For example, the predetermined pattern of vibrations may include a continual vibration that occurs until the wearable device is back inside the approved area.

In block 510, an occurrence of an event may be determined. For example, the mobile device 101 of FIG. 1 and/or the event module 306 of FIG. 3 may determine whether the event occurred. In block 512, in response to the occurrence of the event, a request instruction may be provided to cause the one or more multiple wearable devices to generate haptic feedback or other output. For example, the mobile device 101 of FIG. 1 and/or the communication interface 331 of FIG. 3 may provide the request instruction to the one or more multiple wearable devices 120 of FIG. 1, FIG. 2A, or FIG. 2B. The haptic feedback or other output may include a predetermined pattern of vibrations or other output to request that the one or more multiple wearable devices be physically moved to join a group. For example, the predetermined pattern of vibrations may be four short bursts of buzzes to request that the one or more multiple wearable devices be physically moved to join the group.

In block 514, a request communication may be received from the wearable device of the multiple wearable devices that indicates that a user of the wearable device requests assistance. For example, the mobile device 101 of FIG. 1 and/or the communication interface 331 of FIG. 3 receives the request communication from the wearable device 120 of FIG. 1, FIG. 2A, or FIG. 2B that indicates that the user of the wearable device 120 of FIG. 1, FIG. 2A, or FIG. 2B requests assistance.

In block 516, a user interface may be generated that includes graphics that display the locations of the multiple wearable devices based on the location communications. For example, the mobile device 101 of FIG. 1 and/or the user interface module 308 of FIG. 3 may generate the user interface that includes graphics that display the locations of the multiple wearable devices 120 of FIG. 1, FIG. 2A, or FIG. 2B. FIG. 4 is an example of the user interface 400 that may be generated.

Figure 6:
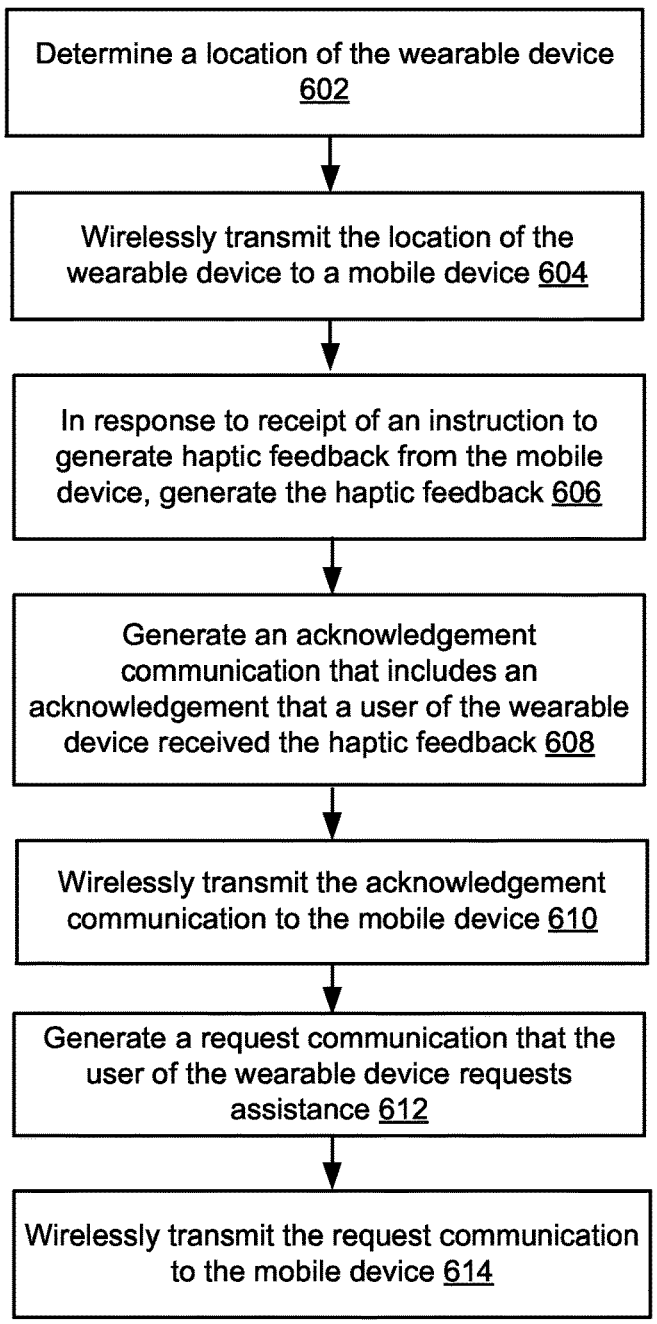
FIG. 6 illustrates an example flow diagram of a method to wirelessly transmit communications to a mobile device.

FIG. 6 illustrates an example flow diagram of a method 600 to wirelessly transmit communications to a mobile device, arranged in accordance with at least one embodiment described herein. The method 600 may be implemented, in whole or in part, by one or more of the wearable devices 120 of FIG. 1, or the communication application 201 of FIG. 2A or FIG. 2B, or another suitable device, server, and/or system. The method 600 may begin at block 602.

In block 602, a location of the wearable device may be determined. For example, the wearable device 120 of FIG. 1 or the location sensor 229 of FIG. 2A or FIG. 2B may determine the location of the wearable device 120 of FIG. 1, FIG. 2A, or FIG. 2B. The location sensor 229 may determine the location of the wearable device 120 from the location data 292 that includes GPS coordinates.

In block 604, the location of the wearable device may be wirelessly transmitted to the mobile device. For example, the wearable device 120 of FIG. 1 and/or the communication interface 231 of FIG. 2A or FIG. 2B may wirelessly transmit the location of the wearable device 120 to the mobile device 101 of FIG. 1 or FIG. 3 using Bluetooth, Wi-Fi, or other suitable wireless communication protocol.

In block 606, in response to receipt of an instruction to generate haptic feedback or other output from the mobile device, the haptic feedback or other output may be generated. For example, the wearable device 120 of FIG. 1 and/or the motor 237 of FIG. 2A or FIG. 2B may generate haptic feedback in response to receipt of the instruction to generate the haptic feedback from the mobile device 101 of FIG. 1 or FIG. 3.

In block 608, an acknowledgement communication may be generated that includes an acknowledgement that a user of the wearable device received the haptic feedback or other output. For example, the wearable device 120 of FIG. 1, the communication application 201 of FIG. 2A or the communication module 202 of FIG. 2B may generate the acknowledgement communication that includes the acknowledgement that the user of the wearable device 120 received the haptic feedback. The acknowledgement communication may be generated in response to the user tapping the touch sensor 233 of FIG. 2A or FIG. 2B a predetermined number of times or providing other suitable input. The touch sensor 233 may include a touchscreen. Alternatively, the touch sensor 233 may include a physical button that the user presses the predetermined number of times.

In block 610, the acknowledgement communication may be wirelessly transmitted to the mobile device. For example, the wearable device 120 of FIG. 1 and/or the communication interface 231 of FIG. 2A or FIG. 2B may wirelessly transmit the acknowledgement communication to the mobile device 101 of FIG. 1 or FIG. 3 using Bluetooth, Wi-Fi, or other suitable wireless communication protocol.

In block 612, a request communication that the user of the wearable device requests assistance may be generated. For example, the wearable device 120 of FIG. 1, the communication application 201 of FIG. 2A, or the communication module 202 of 2B may generate the request communication that the user requests assistance in response to the user tapping the touch sensor 233 of FIG. 2A or FIG. 2B a predetermined number of times or providing other suitable input. The user may request assistance, for example, because the user is lost or is in danger.

In block 614, the request communication may be wirelessly transmitted to the mobile device. For example, the wearable device 120 of FIG. 1 or the communication interface 231 of FIG. 2A or FIG. 2B may wirelessly transmit the request communication to the mobile device 101 of FIG. 1 using Bluetooth or Wi-Fi.

FIG. 7 illustrates an example flow diagram of a method 700 to determine locations of multiple wearable devices using wireless triangulation, arranged in accordance with at least one embodiment described herein. The method 700 may be implemented, in whole or in part, by the mobile device 101 of FIG. 1, the tether application 111 of FIG. 3, or another suitable device, server, and/or system. The method 700 may begin at block 702.

In block 702, location communications may be received from the multiple wearable devices that include location data for the multiple wearable devices. For example, the mobile device 101 of FIG. 1 and/or the communication interface 331 of FIG. 3 may receive location communications from the multiple wearable devices 120 of FIG. 1, FIG. 2A, or FIG. 2B that include the location data 292 of FIG. 2B. The multiple wearable devices may provide location data that include reference points and signal strengths.

In block 704, the locations of the multiple wearable devices may be determined based on the location data using wireless triangulation. For example, the mobile device 101 of FIG. 1 and/or the location module 302 of FIG. 3 may determine the locations of the multiple wearable devices 120 of FIG. 1, FIG. 2A, or FIG. 2B based on the location data 292 of FIG. 2B using wireless triangulation. Wireless triangulation may include signal triangulation that uses the locations of reference points and signal strengths to determine the location of one of the wearable devices. The reference points may include any of a wireless access point, a Wi-Fi hotspot, another wearable device, or a mobile device.

In block 706, it may be determined whether a wearable device of the multiple wearable devices is outside of an approved area based on the locations. For example, the mobile device 101 of FIG. 1 and/or the comparison module 304 of FIG. 3 may determine whether the wearable device of the multiple wearable devices 120 of FIG. 1, FIG. 2A, or FIG. 2B is outside of the approved area. The approved area may include a circular area defined by a threshold distance (e.g., radius) from the mobile device 101 or may be defined by a geofence.

In block 708, in response to determining that the wearable device of the multiple wearable devices is outside of the approved area, an instruction that causes the wearable device to generate haptic feedback or other output may be provided. For example, the mobile device 101 of FIG. 1 and/or the communication interface 331 of FIG. 3 may provide the instruction that causes the wearable device 120 of FIG. 1, FIG. 2A, or FIG. 2B to generate haptic feedback or other output.

In block 710, a user interface may be generated that includes graphics that display the locations of the multiple wearable devices from which the location communications are received. For example, the mobile device 101 and/or the user interface module 308 of FIG. 3 may generate the user interface that includes graphics that display the locations of the multiple wearable devices 120 of FIG. 1, FIG. 2A, or FIG. 2B from which the location communications are received. FIG. 4 is an example of the user interface 400 that may include the locations of the multiple wearable devices that provide location communications.

In block 712, user input may be received based on interactions with the user interface. For example, the mobile device 101 of FIG. 1 and/or the user interface module 308 of FIG. 3 may receive user input based on interactions of the user of the mobile device 101 with the user interface. The user input may include and/or may indicate, for example, information about where the group is to meet after an occurrence of an event.

In block 714, in response to receiving the user input, an informative communication may be provided to any of the multiple wearable devices. For example, the mobile device 101 of FIG. 1 and/or the communication interface 331 of FIG. 3 may provide the informative communication to any of the multiple wearable devices 120 of FIG. 1, FIG. 2A, or FIG. 2B. The informative communication may include the user input about where the group is to meet after the occurrence of the event.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may include any available media that may be accessed by a general-purpose or special-purpose computer. By way of example, and not limitation, such computer-readable media may include non-transitory computer-readable storage media including random access memory (RAM), read-only memory (ROM), electrically erasable programmable read-only memory (EEPROM), compact disc read-only memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware embodiments configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware embodiments or a combination of software and specific hardware embodiments are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method, comprising:
   receiving location communications from multiple wearable devices that indicate locations of the multiple wearable devices;
   determining the locations of the multiple wearable devices based on the location communications; and
   receiving a request communication from a wearable device of the multiple wearable devices that indicates that a user of the wearable device requests assistance,
   wherein each wearable device of the multiple wearable devices comprises:
      a location sensor configured to determine a location of a corresponding wearable device of the multiple wearable devices;
      a communication module communicatively coupled to the location sensor to receive location data from the location sensor describing the location of the corresponding wearable device, the location of the corresponding wearable device described by the communication module in a generated;
      a communication interface communicatively coupled to the communication module to receive the location communication, the location communication wirelessly transmitted by the communication interface to a mobile device, the communication interface communicatively coupled to the mobile device such that a feedback instruction is received from the mobile device at the communication interface, and the communication interface communicatively coupled to the mobile device to wirelessly transmit to the mobile device (i) a request communication and (ii) an acknowledgement communication confirming the feedback instruction was received at the communication interface, wherein both the request communication and the acknowledgement communication are generated via a volume amount of haptic input at the wearable device;
      a motor communicatively coupled to the communication interface to receive the feedback instruction, the motor communicatively coupled to the communication interface such that generation of haptic feedback occurs in response to receipt of the feedback instruction that includes data to cause the motor to generate the haptic feedback; and
      a touch sensor communicatively coupled to the communication module and configured to detect the volume amount of haptic input, including a number of taps from a user of the corresponding wearable device, detect a location of the haptic input, including a position on the touch sensor where the taps from the user occurred, determine that the number of taps or the location of the taps corresponds to a request for assistance from the user, and transmit tap data describing the request to the communication module,
   wherein the communication module is configured to generate the request communication in response to receiving the tap data from the touch sensor.

2. The method of claim 1, further comprising:
   determining, based on the locations of the multiple wearable devices, whether any of the multiple wearable devices are outside of an approved area; and
   in response to determining that the wearable device is outside of the approved area, providing a warning instruction to the wearable device to cause the wearable device to generate haptic feedback.

3. The method of claim 2, wherein the haptic feedback includes a predetermined pattern of vibrations to indicate that the wearable device is outside of the approved area.

4. The method of claim 1, further comprising:
   determining an occurrence of an event; and
   in response to the occurrence of the event, providing a request instruction to cause the wearable device of the multiple wearable devices to generate haptic feedback.

5. The method of claim 4, wherein the event includes an end of a group activity and the haptic feedback includes a predetermined pattern of vibrations to request that the wearable device be physically moved to join a group.

6. The method of claim 1, further comprising generating a user interface that includes graphics that display the locations of the multiple wearable devices based on the location communications.

7. A system, comprising:
   multiple wearable devices, each wearable device of the multiple wearable devices comprising:

a location sensor configured to determine a location of a corresponding wearable device of the multiple wearable devices;

a communication module communicatively coupled to the location sensor to receive location data from the location sensor describing the location of the corresponding wearable device, the location of the corresponding wearable device described by the communication module in a generated;

a communication interface communicatively coupled to the communication module to receive the location communication, the location communication wirelessly transmitted by the communication interface to a mobile device, the communication interface communicatively coupled to the mobile device such that a feedback instruction is received from the mobile device at the communication interface, and the communication interface communicatively coupled to the mobile device to wirelessly transmit to the mobile device (i) a request communication and (ii) an acknowledgement communication confirming the feedback instruction was received at the communication interface, wherein both the request communication and the acknowledgement communication are generated via a volume amount of haptic input at the wearable device;

a motor communicatively coupled to the communication interface to receive the feedback instruction, the motor communicatively coupled to the communication interface such that generation of haptic feedback occurs in response to receipt of the feedback instruction that includes data to cause the motor to generate the haptic feedback; and a touch sensor communicatively coupled to the communication module and configured to detect the volume amount of haptic input, including a number of taps from a user of the corresponding wearable device, detect a location of the haptic input, including a position on the touch sensor where the taps from the user occurred, determine that the number of taps or the location of the taps corresponds to a request for assistance from the user, and transmit tap data describing the request to the communication module, wherein the communication module is configured to generate the request communication in response to receiving the tap data from the touch sensor.

8. The system of claim 7, wherein:

the number of taps or the location of the taps corresponds to an acknowledgement that the user received the haptic feedback and transmit tap data describing the acknowledgement to the communication module; and the communication module is configured to generate the acknowledgement communication in response to receiving the tap data from the touch sensor.

9. The system of claim 7, further comprising a charging pad that wirelessly charges the corresponding wearable device.

10. The system of claim 7, wherein the location sensor uses a global positioning system (GPS) to determine the location of the corresponding wearable device.

11. The system of claim 7, wherein each wearable device of the multiple wearable devices further comprises a flexible material.

12. The system of claim 7, wherein each wearable device of the multiple wearable devices further comprises:

a light-emitting diode (LED) communicatively coupled to the communication interface to receive an emit instruction, the LED further configured to emit an optical signal that conveys information or a request to a user of the corresponding wearable device, wherein the communication interface receives the emit instruction from the mobile device.

13. The system of claim 7, wherein each wearable device of the multiple wearable devices further comprises:

a first light-emitting diode (LED) communicatively coupled to the communication interface to receive a first emit instruction, wherein the first LED is configured to emit, in response to the first emit instruction, a first optical signal to indicate that the corresponding wearable device is outside an approved area; and a second LED communicatively coupled to the communication interface to receive a second emit instruction, wherein the second LED is configured to emit, in response to the second emit instruction, a second optical signal to request that the corresponding wearable device be physically moved to join a group.

14. The system of claim 7, wherein each wearable device of the multiple wearable devices further comprises a display device communicatively coupled to the communication interface and configured to display an informative communication from the mobile device.

15. The system of claim 14, wherein the display device is communicatively coupled to a touch sensor and wherein the display device further comprises a touchscreen configured to receive user input via the touch sensor.

16. An apparatus, comprising:

a processor; and a non-transitory computer-readable medium communicatively coupled to the processor and having stored thereon computer instructions that cause the processor to execute:

receiving location communications from multiple wearable devices that include location data for the multiple wearable devices;

determining locations of the multiple wearable devices based on the location data using wireless triangulation; and generating a user interface that includes graphics that display the locations of the multiple wearable devices from which the location communications are received, wherein each wearable device of the multiple wearable devices comprises:

a location sensor configured to determine a location of a corresponding wearable device of the multiple wearable devices;

a communication module communicatively coupled to the location sensor to receive location data from the location sensor describing the location of the corresponding wearable device, the location of the corresponding wearable device described by the communication module in a generated;

a communication interface communicatively coupled to the communication module to receive the location communication, the location communication wirelessly transmitted by the communication interface to a mobile device, the communication interface communicatively coupled to the mobile device such that a feedback instruction is received from the mobile device at the communication interface, and the communication interface communicatively coupled to the mobile device to wirelessly transmit to the mobile device (i) a request communication and (ii) an acknowledgement communication confirming the feedback instruction was received at the communication interface, wherein both the request communication and the acknowledgement communication are generated via a volume amount of haptic input at the wearable device;

a motor communicatively coupled to the communication interface to receive the feedback instruction, the motor communicatively coupled to the communication interface such that generation of haptic feedback occurs in response to receipt of the feedback instruction that includes data to cause the motor to generate the haptic feedback; and a touch sensor communicatively coupled to the communication module and configured to detect the volume amount of haptic input, including a number of taps from a user of the corresponding wearable device, detect a location of the haptic input, including a position on the touch sensor where the taps from the user occurred, determine that the number of taps or the location of the taps corresponds to a request for assistance from the user, and transmit tap data describing the request to the communication module, wherein the communication module is configured to generate the request communication in response to receiving the tap data from the touch sensor.

17. The apparatus of claim 16, wherein the computer instructions further cause the processor to execute:

determining whether a wearable device of the multiple wearable devices is outside of an approved area based on the locations; and in response to determining that the wearable device of the multiple wearable devices is outside of the approved area, providing an instruction that causes the wearable device to generate haptic feedback.

18. The apparatus of claim 16, wherein the computer instructions further cause the processor to execute:

receiving user input; and generating an informative communication that is provided to a wearable device of the multiple wearable devices and displayed on a display device of the wearable device.

19. The apparatus of claim 16, wherein the wireless triangulation is based on reference points that include any of a wireless access point, a Wi-Fi hotspot, another wearable device, and a mobile device.

* * * * *